United States Patent
Foss

(10) Patent No.: US 7,567,573 B2
(45) Date of Patent: Jul. 28, 2009

(54) METHOD FOR AUTOMATIC TRAFFIC INTERCEPTION

(75) Inventor: Andrew Foss, San Jose, CA (US)

(73) Assignee: F5 Networks, Inc., Seattle, WA (US)

( * ) Notice: Subject to any disclaimer, the term of this patent is extended or adjusted under 35 U.S.C. 154(b) by 736 days.

(21) Appl. No.: 10/935,540

(22) Filed: Sep. 7, 2004

(65) Prior Publication Data

US 2006/0050703 A1    Mar. 9, 2006

(51) Int. Cl.
*H04L 12/56* (2006.01)
(52) U.S. Cl. ............... 370/395.54; 370/392; 370/401; 709/228
(58) Field of Classification Search ......... 370/217, 370/219, 389, 392, 475; 709/217, 221, 230, 709/238; 713/201, 223
See application file for complete search history.

(56) References Cited

U.S. PATENT DOCUMENTS

| | | | | |
|---|---|---|---|---|
| 6,049,825 A * | 4/2000 | Yamamoto | ............... | 709/221 |
| 6,108,300 A * | 8/2000 | Coile et al. | ............... | 370/217 |
| 6,112,248 A * | 8/2000 | Maciel et al. | ............... | 709/238 |
| 6,128,294 A * | 10/2000 | Oura et al. | ............... | 370/389 |
| 6,151,331 A * | 11/2000 | Wilson | ............... | 370/465 |
| 6,157,644 A * | 12/2000 | Bernstein et al. | ............... | 370/392 |
| 6,157,955 A | 12/2000 | Narad et al. | | |
| 6,339,595 B1 | 1/2002 | Rekhter et al. | | |
| 6,401,117 B1 | 6/2002 | Narad et al. | | |
| 6,581,166 B1 * | 6/2003 | Hirst et al. | ............... | 714/4 |
| 6,631,416 B2 | 10/2003 | Bendinelli et al. | | |
| 6,678,734 B1 * | 1/2004 | Haatainen et al. | ............... | 709/230 |
| 6,779,039 B1 * | 8/2004 | Bommareddy et al. | ............... | 709/238 |
| 6,925,079 B2 * | 8/2005 | Matsukawa | ............... | 370/389 |
| 6,990,101 B1 * | 1/2006 | Chow et al. | ............... | 370/392 |
| 7,023,795 B1 * | 4/2006 | Hwu | ............... | 370/219 |
| 7,088,689 B2 * | 8/2006 | Lee et al. | ............... | 370/282 |

(Continued)

OTHER PUBLICATIONS

Lakshmanan, Yegappan. ARP: Questions & Answers, [online], Feb. 19, 1999 [retrieved on Aug. 19, 2004] Retrieved from the Internet http://www.geocities.com/Silicon Valley/Vista/8672/network/arp.html.

(Continued)

*Primary Examiner*—Hassan Kizou
*Assistant Examiner*—Emmanuel Maglo
(74) *Attorney, Agent, or Firm*—Darby & Darby P.C.; Jamie L. Wiegand

(57) ABSTRACT

A technique for connecting New Network Devices (NNDs) to an existing communication network. The NND caches the MAC address of an Original (or "Old") Network Device, then gratuitously transmits Address Resolution Protocol (ARP) responses on behalf of the OND, but pointing to its own MAC address. This, in effect, allows the NND to insert itself in the path of packets originally destined for the OND. After performing its designated operations such as filtering, compression, caching, file serving, virus scanning, etc., any remaining packets can still be forwarded to the OND for further processing. In this event, the packets are forwarded by the NND to the OND as MAC layer frames using the OND's MAC address only and not its IP address. In the event that the NND fails, no special steps need to be taken, as the OND will eventually receive traffic again as it responds to further ARP requests.

28 Claims, 3 Drawing Sheets

U.S. PATENT DOCUMENTS

| | | | |
|---|---|---|---|
| 2002/0052972 A1* | 5/2002 | Yim | 709/245 |
| 2002/0112076 A1* | 8/2002 | Rueda et al. | 709/245 |
| 2003/0229809 A1* | 12/2003 | Wexler et al. | 713/201 |
| 2004/0059909 A1* | 3/2004 | Le Pennec et al. | 713/153 |
| 2004/0162992 A1* | 8/2004 | Sami et al. | 713/200 |
| 2004/0250158 A1* | 12/2004 | Le Pennec et al. | 714/4 |

OTHER PUBLICATIONS

IP, Internet Protocol, *Network Sorcery, Inc.* [online], copyright 1998, 1999, 2000, 2001, 2002, 2002, 2003, 2004 [retrieved on Aug. 19, 2004] Retrieved from the Internet http://www.networksorcery.com/enp/protocol/ip.htm.

Whalen, Sean. An Introduction to Arp Spoofing, Apr. 2001, Revision 1.

* cited by examiner

METHOD FOR AUTOMATIC TRAFFIC INTERCEPTION

BACKGROUND OF THE INVENTION

Introduction

The present invention is directed to communication networking, and in particular to techniques for installing new network devices without the need to reprogram routing information or modify existing network devices.

It is safe to say that an efficiently running communication network is now an absolute necessity for almost any business enterprise. The proliferation of inexpensive Personal Computers (PCs) and ubiquitous networking infrastructure has done much to improve personal productivity over the past several decades. Many Information Technology (IT) professionals spend their time installing network infrastructure, as well as connecting new devices and reconfiguring existing devices in the network.

Network Addressing Schemes

For example, proper installation of a New Network Device (NND) requires configuring different network addresses before the device can begin to communicate—in particular, addresses need to be assigned to the new device in such a manner as to avoid conflicts with existing devices. It can therefore become difficult for administrative users to configure devices so that no two share the same address.

The most common networking protocols are Transmission Control Protocol/Internet Protocol (TCP/IP), which are transport/network layer protocols, and Media-Access Control (MAC) protocol, used at the so-called link layer. The typical device connected to a network thus needs two unique address. One is the address of its network interface or MAC address. The MAC address, in theory, is a globally-unique and unchangeable address which is stored in the equipment hardware. MAC addresses are necessary so that the Ethernet protocol can send data independent of whatever higher layer application protocols are used on top of it. The Ethernet is principally responsible for building "frames" of data consisting of 1500 by blocks. Each frame has an Ethernet header containing the MAC address of the source computer and the MAC address of the destination computer.

A second address required for each computer is typically an IP address. IP is a network layer protocol that allows application layer software to communicate without regard to the exact network technology used. Each computer on a network must, therefore, also have a unique IP address so that application layer software can communicate. IP addresses are virtual and are typically assigned via software.

IP and Ethernet addressing schemes must work together to deliver data from a source to a destination. IP communicates by constructing "packets" which are similar to frames, but which have a different structure. Packets cannot be delivered without network layer processing. In the most common case, they are delivered by the Ethernet layer, which splits the packets into frames adding an Ethernet header, for and sending them along a physical path (which may be wired or wireless) to a switch. The switch then decides which port to send the frame to, by comparing the destination MAC address of the frame to an internal table which maps port numbers to MAC addresses.

Address Resolution Protocol (ARP)

However, at the time of constructing a frame, an Ethernet layer processor has no idea what the MAC address of the destination machine is, which it needs to create an Ethernet header. The only information it has available is the destination IP address, taken from the packet header that the IP application software provided. Therefore, some way must be provided for the Ethernet packet processor to find the MAC address of a destination machine, given the destination's IP address.

This is where the Address Resolution Protocol (ARP) finds use. ARP is a network protocol which maps a network layer address to a data link layer address. For example, ARP can be used to resolve an IP address to a corresponding MAC layer Ethernet address.

ARP operates by sending out a special type of packet called a "ARP request". An ARP requests asks the question, "Is your IP address x.x.x.x"? "If so, send your MAC address back to me." These packets are broadcast to all computers on a (LAN), even on a switched network.

Each computer receiving an ARP request examines it to see if it is currently assigned to a specific IP. If so, it sends a specialized reply packet called an "ARP reply" containing the corresponding MAC address. To minimize the number of ARP packets being broadcast, operating systems typically keep a cache of ARP reply messages. When a computer receives an ARP reply, it will update its ARP cache with a new IP/MAC pair association. As ARP is a stateless protocol, most operating systems will update their ARP cache wherever a reply is received, regardless of whether they have sent out an ARP request.

When an ARP needs to resolve a given IP address to an Ethernet address, it thus broadcasts an ARP request packet. The ARP request contains a source MAC address, a source IP address, and a destination IP address. Each host in the local network then receives the ARP request packet. The host with the specified destination IP address sends an ARP reply packet to the originating host with its MAC address.

In the event a host is not able to obtain a MAC address for a particular IP address, it will then resort to using other protocols such as a Domain Name Service (DNS) protocol, to obtain the IP address of another host, which may be remotely located. For remote accesses, a local network router typically maintains a cache of a such IP/MAC mappings for remotely located machines.

ARP Spoofing

ARP spoofing is a technique that is used to exploit the interaction of IP and Ethernet protocols in order to attack a network. By sending a forged ARP reply packet, a target computer can be convinced to send frames destined for a first computer to instead go to a second computer controlled by a malicious attacker. This can be done in such a way that the first computer has no idea that redirection to the second malicious computer is taking place. The process of updating a target computer's ARP cache with a forged entry is referred to as ARP cache "poisoning". A so-called man-in-the-middle attack (MiM) can be performed with a malicious user inserting his computer between the communication path of two target computers. The malicious computer forwards frames between the two target computers so that communications are not interrupted, and so that neither of the targets are aware of the attack. The attack is performed with the attacker poisoning the ARP cache of both the source and destination computer, associating the destination computers and source computers IP with its own MAC layer address. All of the target computer's IP traffic will then be routed to the attacker's computer instead of directly to one another. More information on ARP spoofing can be obtained in the paper by Whalen, S., "An Introduction to ARP Spoofing", April, 2001.

SUMMARY OF THE INVENTION

There are presently two options when installing a New Network Device (NND) that is intended to intercept traffic addressed to a destination that is an existing Original (or "Old") Network Device (OND), without changing routing information on the network.

The first option is to physically attach the NND in line with the OND. This approach works well, but, for certain network configurations, it is not possible. In other words, when the OND has several interfaces, this would require several NNDs to be installed, and it becomes problematic. This approach is also a possible problem in that the NND is installed "in-line" with the OND. If the NND fails, then traffic may also no longer be forwarded to the OND.

A second approach is to modify network routing information to send traffic directly to the NND instead of the OND. This, however, is labor intensive for the administrator. It also introduces risks of a different type. For example, even if the network administrator properly configures the NND with a unique address, when the NND fails, traffic will still be routed to it, until the routing information is again reprogrammed. Because this approach can also interrupt network operation, it too is often considered to be less than desirable.

The present invention is directed to solving the problem of installing a New Network Device (NND), typically one that has a function of packet inspection, filtering, caching, proxying, load balancing, virus scanning, or the like such that it needs to intercept the traffic destined for an Original Network Device (OND). Such a function may be commonly implemented in a router, default gateway, or with a file server. The present invention allows installation of the NND without manually changing routing information for the OND.

In accordance with one aspect of the present invention, the New Network Device (NND) caches the MAC address of the Original Network Device (OND) to be intercepted. It then gratuitously transmits ARP responses on behalf of the OND, pointing to its own MAC address instead. In effect, the NND thus inserts itself into the network path of the packets originally destined for the OND.

The NND can then operate on the packets originally destined for the OND. Depending upon its assigned function, it can either reply on behalf of the OND, or if its assigned operations are filtering, compression, caching, etc., it may forward any processed IP packets to the OND for further processing. At this point, the NND will forward packets to the NND as MAC layer frames, using MAC layer addressing only, and not using the IP address of the OND. This is typically possible since the OND will usually be connected to the same LAN segment as the OND. The OND can then process the MAC layer frames as it would normally.

If the NND fails, with this approach, the network operation might be interrupted, but only temporarily. Operation will resume normally when the OND broadcasts its own ARP reply packet with its real IP address and real MAC addresses. This then allows the OND to resume operation as it had prior to installation of the NND.

It should be understood that the above process is different from a network attacker's approach of cache poisoning, in that with the invention, both the OND and the NND are under control of the same system administrator. In other words, here, the NND is authorized to perform the transmission of gratuitous ARP responses on behalf of the OND, unlike the scenario of a malicious attack from an outsider.

In accordance with other aspects of the preferred embodiment, an NND also looks for ARP refresh requests by the OND. When the NND sees such a refresh request, it immediately sends another ARP request with its own MAC address. This prevents packets from being routed to the OND even after the OND send its own ARP reply or when the OND otherwise attempts to reconfigure the network.

When the NND fails to operate, it will stop sending ARP request messages. This allows the OND to again send a reply to any ARP request messages that it sees, causing the network routers to reconfigure themselves automatically, to then stop sending messages to the NND.

The present invention has several advantages. An important advantage is the fact that the network administrator avoids having to otherwise manually configure the ARP table of the NND during its installation. The NND can thus configure itself automatically.

The invention also allows for installation of the NND with minimal interruption or upsetting of the operation of existing devices on the network. The NND is simply enabled, and it begins to participate in network operations as soon as it has a chance to reply to an ARP request packet.

In addition, when the NND is disabled or failed, the OND will simply take its place as soon as the OND has a chance to send an ARP reply itself.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
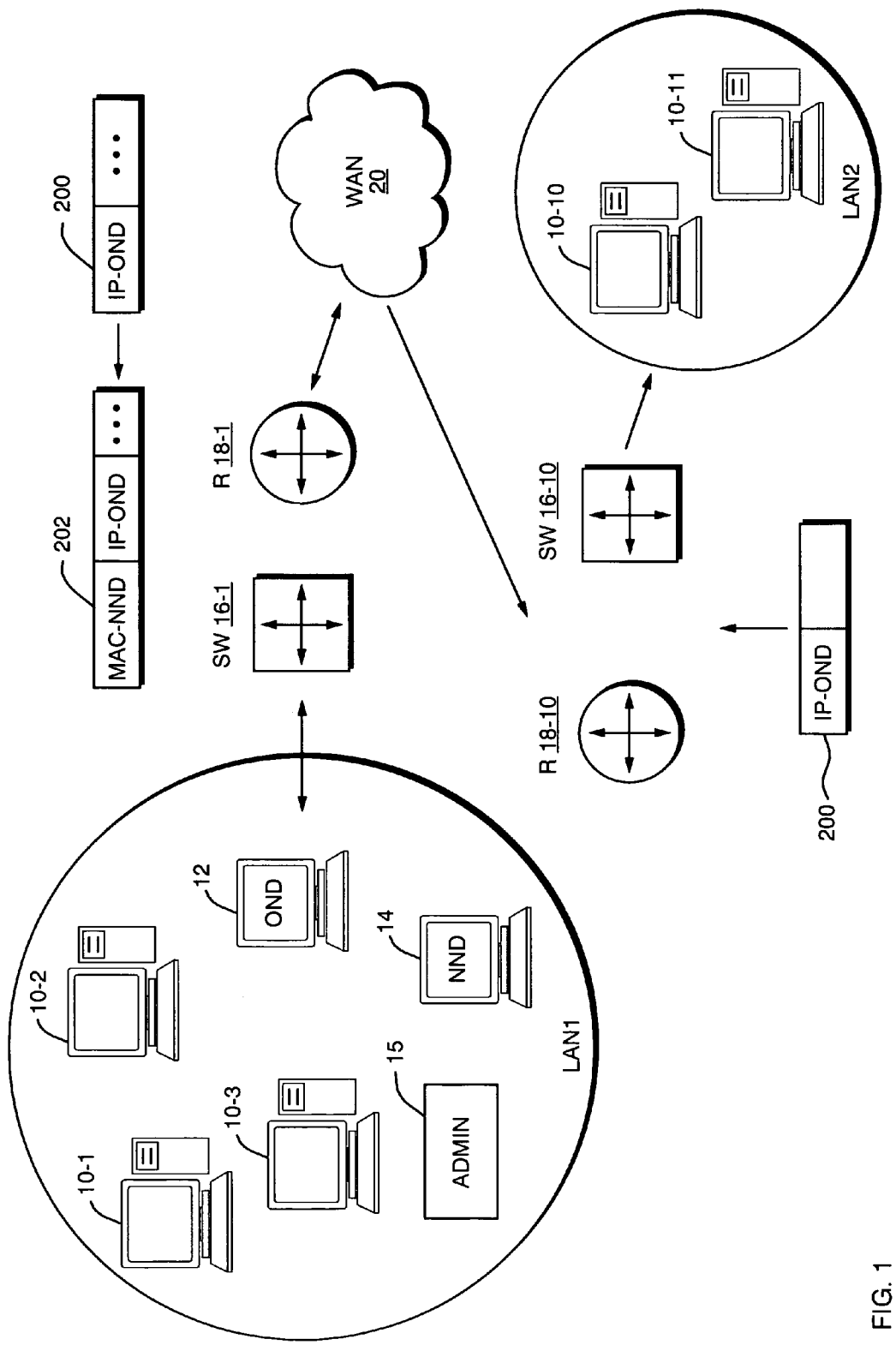
FIG. 1 is a high level diagram of a network environment in which the invention may be used.

Turning attention now to FIG. 1, there is shown a block diagram of a typical network environment. A first Local Area Network (LAN 1) consists of a number of computing devices connected by a physical network medium, such as Ethernet. The devices connected to LAN 1 include personal computers (PCs) 10-1, 10-2, 10-3 and other devices such as Original Network Device (OND) 12. The physical layer of LAN 1 may be implemented using any of the known Ethernet protocols, such as IEEE 802.3 wired Ethernet, 802.11 wireless Ethernet, token ring or other similar protocols. As will be described below, a New Network Device (NND) 14 is to be connected to LAN 1.

LAN 1 is also connected to other networks, such as a wide area network 20, through a switch SW 16-1 and/or router 18-1. Still other networks may include a second Local Area Network (LAN 2) that is also connected to the WAN 20 such as through its own router 18-10 and switch 16-10. LAN 2 includes other PC's 10-10 and 10-11. It should be understood that myriad other arrangements are possible for LAN 1 and LAN 2. In addition, while there are shown a switch 16 and router 18 associated with each LAN, there are also myriad known arrangements for internetworking devices to provide connections between networks.

In the envisioned scenario, the New Network Device (NND) 14 is to be substituted for all, or at least part of, the functionality of the Original Network Device (OND) 12. The NND 14 thus must be arranged to intercept traffic destined for OND 12, without manually changing the address information in switch 16-1 or router 18-1 for LAN 1. In particular, OND 12 may be functioning as a router, a default gateway, some sort of file server, packet filter, or other function.

It may be desirable, for example, to have the NND 14 assist the OND 12 with sharing some of the processing load on OND 12. For example, large numbers of remotely located PC's 10 connected through other LANs may be making demands on OND 12 as a file server, such as to access Web pages hosted by the OND 12.

In other instances, the NND 12 may be an improved communication device for efficiently routing messages between LAN 1 and LAN 2.

In still other configurations, the NND 14 can be inserted logically in the network before the OND 12. This could be done, if the NND 14 is to serve as a virus checker and the OND 12 as a mail server, the NND 14 as a content filter and the OND as a web proxy, or the NND as firewall with multiple ONDs being a server farm, as just a few of the possible examples.

What is important to understand is that the administrator 15 for LAN 1 is, with his knowledge, expressly requesting that NND 14 be substituted at least in part for the functionality of OND 12. This is unlike the case of ARP cache poisoning where a malicious user is attempting to control access to the LAN 1.

Figure 2:
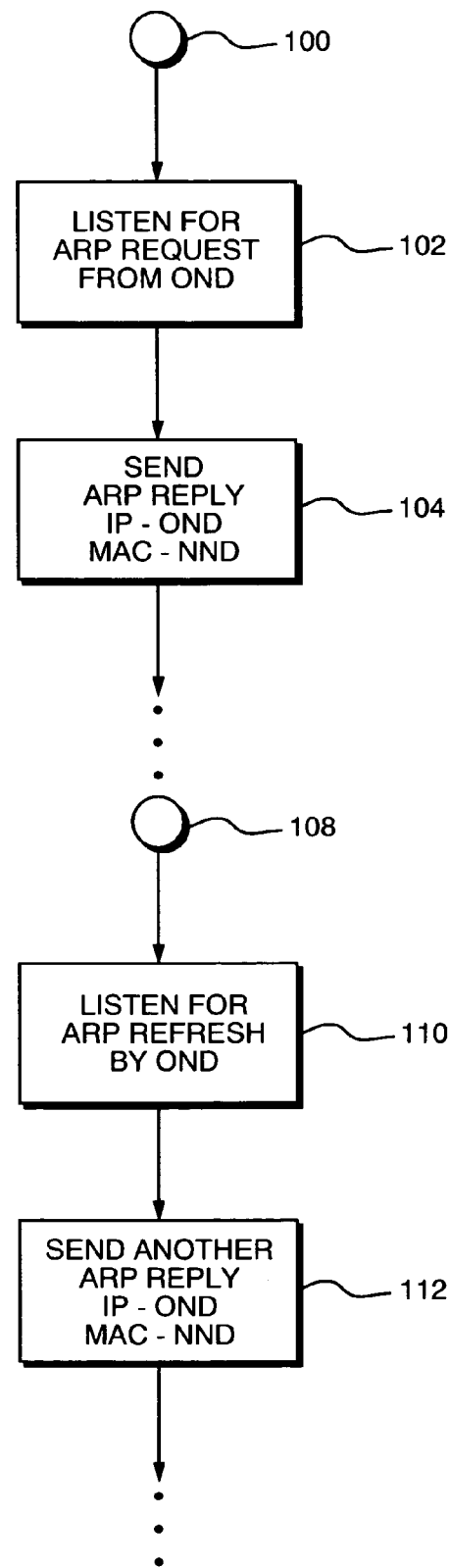
FIG. 2 is a block diagram of operations performed by a New Network Device, namely its participation in the ARP protocol, on behalf of an Original Network Device.

FIG. 2 is a flowchart of some of the operations performed by the invention. It should be understood that the NND 14 may or may not be connected in line with the OND 12 and indeed, it is actually preferable for the NND to be physically attached as a peer device. This avoids a configuration where the OND 12 has several interfaces requiring installation of multiple NNDs, or where failure of the NND 14 would implicate failure of the OND 12.

In accordance with aspects of the invention, the NND 14 will be substituted for functionality of the OND 12 without the need to reprogram routing information. This avoids, therefore, interruption of network traffic and also reduces an element of risk which could otherwise interrupt network operation in the event that the NND 14 fails.

More particularly, from an initial state 100, a state 102 is entered in which the NND 14 listens for an "ARP request" packet originating from OND 12. Once the ARP request is seen, state 104 is entered in which an "ARP reply" packet is generated by NND 14. In particular, the ARP reply will have an IP address equal to the IP address of the OND 12, but indicate a MAC layer address assigned to the NND 14. The NND 14 does this gratuitously, without further programming of the OND 12 or intervention from other machines 10 connected to the LAN 1.

By transmitting ARP responses on behalf of the OND 12, the NND 14 in effect asserts itself in the network path of the packets originally destined to go the OND 12. In particular, any packets originating, for example, from LAN 2 at device 10-10 destined for OND 12 will travel through wide area network 20 and arrive at LAN 1 and then forwarded by the router 18 and/or switch 16 to the NND 14, instead of the OND 12.

Thus, upon arrival of such packets at inter-networking equipment such as switch 16 or router 18 that have been reprogrammed by the ARP responses originating from the NND 14, such packets will be forwarded to NND 14 instead of OND 12 even if the packets originated at LAN 2 with a destination address of IP address of OND 12. As shown in FIG. 1, a packet 200 arriving at router 18-1 will be routed to the MAC layer address for the NND 14 as modified packet 202.

In order to ensure that such programming remains intact, the NND 14 preferably engages in additional actions as follows. From the state 108, the NND 14 also listens for "ARP refresh" packets originating from the OND 12. Upon seeing them, a state 112 is entered in which another "ARP reply" packet is sent by the NND 14. This additional ARP reply will also indicate an IP address of OND upon a MAC address of the NND 14.

Figure 3:
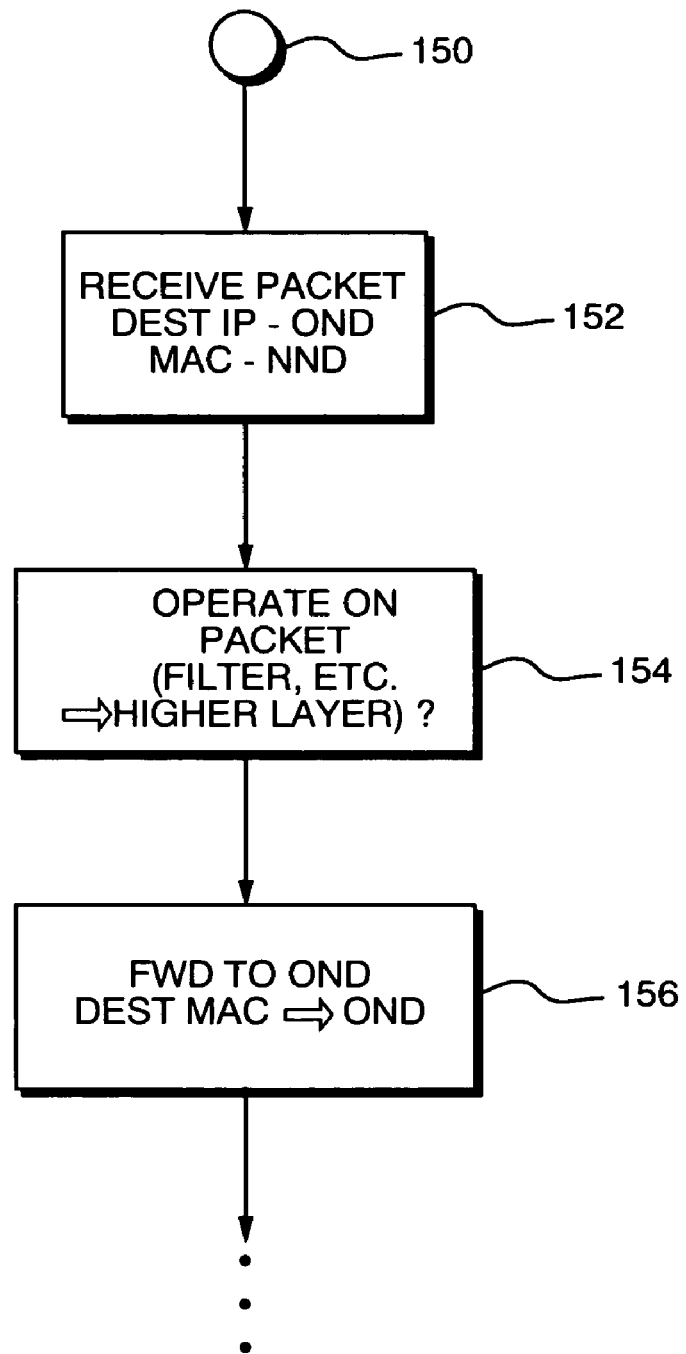
FIG. 3 is a flow chart of operations performed by the New Network Device upon reception of an IP packet destined for an Original Network Device.

FIG. 3 illustrates a sequence of operations performed by the NND 14 upon receipt of packets. In particular, from an initial state 150, a state 152 is entered in which a packet is received which has a destination IP of the OND and a MAC layer address of the NND. Such packet may be, for example, packet 202 illustrated in FIG. 1.

With the packet 202 having arrived at the NND 14 before the OND 12, the NND 14 may then operate on packet 202. Such operations will depend upon the function of the NND 14. For example, if NND 14 is a web page server intended to off load OND 12, the packet may be handled by NND and/or may be forwarded for further processing by OND 12. Such operations may include forwarding the packet to a higher level protocol such as the HTTP protocol in which a web page server is participating. It is understood that if the NND 14 is performing other functions, such as a packet filter, firewall, virus checker, etc., then it performs functions appropriate to its assigned task(s).

Once finished with its assigned tasks on the packet 202, depending upon its assigned function(s), the NND may need to forward the packet 202 to the OND in step 156 for further processing. In such an instance, the destination MAC address will be reset to OND 14 so that the packet will properly reach its destination at OND 12. The packet can be forwarded using the MAC layer address only at this point, since OND 12 is known to be on the same LAN 1 as NND 14.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for operating a communication network having at least an Original Network Device (OND) and a New Network Device (NND), the OND and NND under administration by the same authorized network administrator, the method comprising the steps of, at the NND:

detecting a first address resolution message on the network destined for the OND; and transmitting a first address resolution response message on behalf of the OND, the first address resolution response message including a first layer protocol address associated with the OND, and a second layer protocol address associated with the NND; and in response to an address resolution request message originating from the OND and received at the NND over the network, transmitting a second address resolution response message from the NND over the network, the second address resolution response message mapping the first layer protocol address associated with the OND to the second layer protocol address associated with the NND.

2. A method as in claim 1 wherein the first layer protocol is a link layer protocol.

3. A method as in claim 2 wherein the link layer protocol is Media Access Control (MAC).

4. A method as in claim 1 wherein the second layer protocol is a network layer protocol.

5. A method as in claim 4 wherein the network layer protocol is Internet Protocol (IP).

6. A method as in claim 1 wherein the first address resolution message is an Address Resolution Protocol (ARP) request packet.

7. A method as in claim 1 wherein the first address resolution response message is an Address Resolution Protocol (ARP) reply packet sent in response to an ARP request packet.

8. A method as in claim 1 additionally comprising, at the NND:
   detecting the address resolution request message, wherein the address resolution request message is an address resolution refresh request message originating at the OND; and
   in response thereto, sending the second address resolution response message with the first layer address of the OND and the second layer address of the NND.

9. A method as in claim 1 additionally comprising, at the NND:
   processing at least one packet originally addressed to the OND.

10. A method as in claim 9 wherein the processing performed by the NND is at least one of a packet filter, packet compressor, file server, router, and gateway.

11. A method as in claim 9 additionally comprising:
    replying to packets originally addressed to the OND on behalf of the OND.

12. A method as in claim 9 additionally comprising:
    forwarding one or more unprocessed packets to the OND for further processing.

13. A method as in claim 12 wherein the step of forwarding packets to the OND by the NND forwards packets using only the first protocol layer address of the OND and not the second protocol layer address of the OND.

14. A method as in claim 1 wherein, after the NND enters a mode where it is not operating, at the OND,
    detecting a second address resolution message destined for the OND; and
    transmitting a third address resolution response message on its own behalf, the third address resolution response message including a first network layer protocol address associated with the OND, and a second network layer protocol address associated with the OND.

15. A New Network Device (NND) apparatus for operating in a communication network with an Original Network Device (OND), the NND and OND both being under administration by the same authorized network administrator, the NND comprising:
    a network message receiver, for receiving a first address resolution message on the network destined for the OND; and
    a network message transmitter, for transmitting a first address resolution response message on behalf of the OND, the first address resolution response message including a first layer protocol address associated with the OND, and a second layer protocol address associated with the NND; and
    in response to an address resolution request message originating from the OND and received over the network at the network message receiver, transmitting a second address resolution response message from the NND over the network, the second address resolution response message mapping the first layer protocol address associated with the OND to the second layer protocol address associated with the NND.

16. An apparatus as in claim 15 wherein the first layer protocol is a link layer protocol.

17. An apparatus as in claim 16 wherein the link layer protocol is Media Access Control (MAC).

18. An apparatus as in claim 15 wherein the second layer protocol is a network layer protocol.

19. An apparatus as in claim 18 wherein the network layer protocol is Internet Protocol (IP).

20. An apparatus as in claim 15 wherein the first address resolution message is an Address Resolution Protocol (ARP) request packet.

21. An apparatus as in claim 15 wherein the first address resolution response message is an Address Resolution Protocol (ARP) reply packet sent in response to an ARP request packet.

22. An apparatus as in claim 15 wherein the NND additionally comprises: a receiver for receiving the address resolution request message, wherein the address resolution request message is an address resolution refresh request message; and in response thereto, sending the second address resolution response message with the first layer address of the OND and the second layer address of the NND.

23. An apparatus as in claim 15 wherein the NND additionally comprises: a packet processor for processing at least one packet originally addressed to the OND.

24. An apparatus as in claim 23 wherein the packet processor is at least one of a packet filter, packet compressor, file server, router, virus checker, and gateway.

25. An apparatus as in claim 23 wherein the packet processor additionally replies to packets originally addressed to the OND on behalf of the OND.

26. An apparatus as in claim 23 wherein the packet processor additionally forwards one or more unprocessed packets to the OND for further processing.

27. An apparatus as in claim 26 wherein the NND forwards packets to the OND using only the first protocol layer address of the OND and not the second protocol layer address of the OND.

28. An apparatus as in claim 15 additionally comprising an OND, where the OND itself further comprises:
    a receiver, for receiving a second address resolution message destined for the OND if the NND is not functioning; and
    a transmitter, for transmitting a third address resolution response message on behalf of the OND, the third address resolution response message including a first network layer protocol address associated with the OND, and a second network layer protocol address associated with the OND.

* * * * *